United States Patent [19]

Ziaylek, Jr. et al.

[11] Patent Number: 4,848,714

[45] Date of Patent: Jul. 18, 1989

[54] MOUNTING PLATE WITH ROLLERS

[76] Inventors: Theodore Ziaylek, Jr., 140 Riverview Dr.; Michael P. Ziaylek, 3 Brook La., both of Yardley, Pa. 19067

[21] Appl. No.: 164,701

[22] Filed: Mar. 7, 1988

Related U.S. Application Data

[63] Continuation of Ser. No. 106,490, Oct. 9, 1987.

[51] Int. Cl.⁴ ............................................. F16M 13/00
[52] U.S. Cl. ..................................................... 248/313
[58] Field of Search ............... 248/544, 103, 113, 310, 248/311.2, 311.3, 316.7, 313, 154; 211/71, 88; 24/545–547, 555–556, 561, 563–564, 543, 504; 269/289 MR, 254 R, 285

[56] References Cited

U.S. PATENT DOCUMENTS

| | | | |
|---|---|---|---|
| 1,117,491 | 11/1914 | Hornung | 248/113 |
| 1,798,028 | 3/1931 | Nachtigal | 248/113 |
| 1,911,781 | 5/1933 | Wolfe | 248/113 |
| 1,925,767 | 9/1933 | Mallory | 248/113 |
| 2,029,051 | 1/1936 | Blevins | 248/313 |
| 2,289,701 | 7/1942 | Engel | 248/311.2 |
| 2,614,519 | 10/1952 | Paladino | 248/313 |
| 3,224,644 | 12/1965 | Davis | 248/313 |
| 3,224,720 | 12/1965 | Hain | 248/313 |
| 3,603,550 | 12/1973 | Brodersen | 211/88 |
| 3,780,972 | 9/1971 | Byrd | 248/313 |

Primary Examiner—J. Franklin Foss
Assistant Examiner—Robert A. Olson
Attorney, Agent, or Firm—Sperry, Zoda & Kane

[57] ABSTRACT

A mounting plate or bracket, of the type used by firefighters or members of rescue squads, is equipped with rollers at the free ends of springable clamp arms. The location and the extent of projection of the rollers, in respect to the form and location of the clamp arms, facilitates entry and removal of the air cylinder of a self-contained breathing apparatus (SCBA). An air cylinder favored today is of the composite type, comprising a lightweight aluminum shell about which glass fiber filaments impregnated with epoxy resin are wrapped both longitudinally and helically. A cylinder of this type presents a disadvantage in that breakage of even a few filaments causes loosening of the entire wrap. This in turn requires that the cylinder by re-wrapped completely, at substantial expense. The present invention, as compared to mounting plates or air cylinder support brackets previously in use, allows the air cylinder to be moved into or out of engagement with the clamp arms without breakage or other damage to the glass fiber filaments of the supported cylinder.

2 Claims, 4 Drawing Sheets

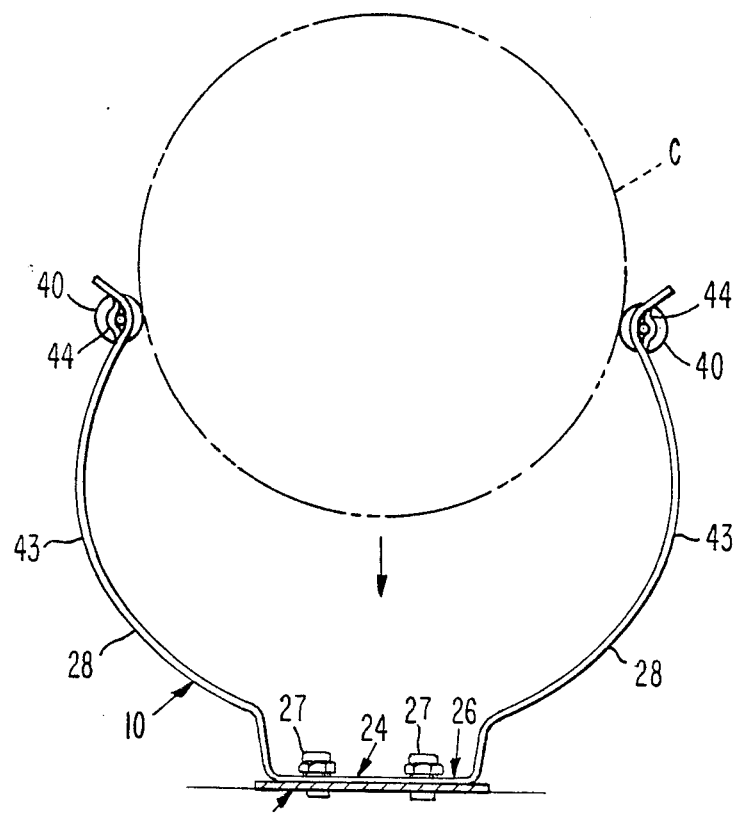
_Fig_6_
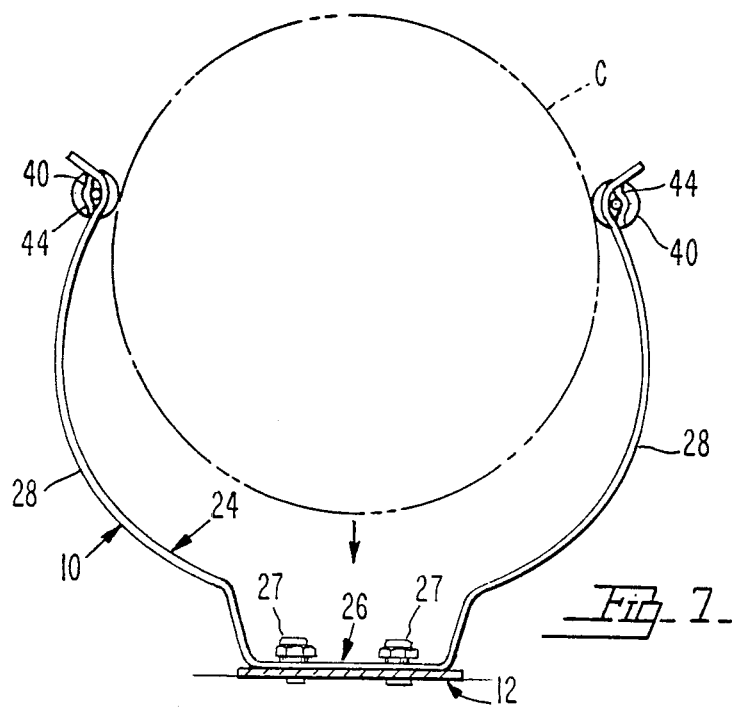
_Fig_7_

MOUNTING PLATE WITH ROLLERS

CROSS REFERENCE TO RELATED APPLICATIONS

The present invention is a continuation of design application Ser. No. 106,490 filed Oct. 9, 1987, titled "Mounting Plate With Rollers".

BACKGROUND OF THE INVENTION

1. Field of the Invention

The present invention relates generally to the field of self-contained breathing apparatus, of the type wherein an air cylinder is supported by a bracket or mounting plate attached to a wall within a fire house or the quarters of a rescue squad, or to a wall of a fire truck or rescue squad vehicle. A bracket of this type commonly utilizes forwardly projecting spring clamp arms, releasably engaging an air cylinder pre-attached to a harness worn by the user. The air cylinder is supported by the harness upon one's back, so that when the firefighter or rescue squad member walks away from the bracket, the clamp arms are sprung apart to release the air cylinder.

2. Description of the Prior Art

Heretofore, mounting brackets or support plates for SCBA air cylinders have been very well known, and commonly employ a vertically extending, generally flat backplate, from which upper and lower pairs of clamp arms extend to releasably engage the supported air cylinder. Examples of such arrangements will be seen, for instance, in patents such as Ziaylek Design Patents U.S. Pat. No. Des. 222,527 issued Nov. 2, 1971; and U.S. Pat. No. Des. 237,357 issued Oct. 28, 1975.

These and other brackets or mounting plates designed for quick release of a supported SCBA air cylinder were designed for use with SCBA cylinders of an older type, manufactured of heavy steel. An empty steel cylinder for 30-minutes-use generally weighs about 19 lbs. The air and cylinder valve add about four more pounds, bringing the total weight of a typical SCBA utilizing a steel cylinder to approximately 33 lbs. Aluminum cylinders were introduced in 1974 or thereabouts, in an early attempt to reduce the total weight of the SCBA.

The cylinder resulting from this development itself weighed about 17 lbs. The resultant reduction in weight was not impressive. Accordingly, more recently an air cylinder known as a composite cylinder has been developed. That which has proved to be the strongest and most durable is in the form of a relatively lightweight, seamless aluminum liner, about which many layers of high strength glass fiber filaments are wound. The filaments are impregnated with epoxy resin, and include layers wrapped longitudinally of the metal shell. Thereafter, they further include helical wrappings.

The composite cylinder resulting from this arrangement is strongly reinforced, and yet the total weight is only half that of a steel cylinder.

The problem with this important development in SCBA air cylinders lies in the delicacy of the windings. The mere act of pressing a cylinder into a supported position upon the mounting bracket involves contact with the clamp arms adjacent the distal extremities thereof. Such contact often results in severing of some of the glass fiber filaments, especially when the clamp arms may be canted slightly, to an extent where the edges thereof may exert a cutting action on the glass fibers.

When the user dons the SCBA and walks away from the mounting bracket, pulling the air cylinder free, a further tendency to cut the fibers manifests itself. When this happens, the windings become loose and the cylinder loses its strength.

In such an event, the cylinder must be taken out of service, and rewound at substantial expense. It becomes important, accordingly, to consider means for eliminating or at least materially reducing the tendency of damage to the composite cylinder resulting from insertion in or removal from the clamp arms of a mounting bracket. So far as is known, however, no such means has yet been devised, that will produce this desirable result, and at the same time will maintain the required capability of the clamp arms for tightly gripping the air cylinder while it is not in use, and yet releasing the cylinder instantly in an emergency situation.

SUMMARY OF THE INVENTION

Summarized briefly, the present invention embraces the concept of mounting rollers on the distal portions of the clamp arms. Beyond this broad concept, however, the invention involves the provision of said rollers at such locations, relative to the form and springable characteristics of the clamp arms, and relative further to the diameter of the cylinder, as to cause the cylinder to contact only the rollers upon insertion, and move into contact with the clamp arms only when fully inserted therebetween.

The concept further involves the contact of the cylinder by the rollers instantly upon the exertion of a force tending to pull the cylinder out from between the clamp arms, a situation which would occur of course in any emergency situation.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 6 is a view similar to FIG. 4 in which the cylinder has been inserted almost half way, and has spread the clamp arms still further apart;

FIG. 7 is a view like FIG. 4 in which the cylinder has been inserted more than half way;

FIG. 10 is a view on the same scale as FIG. 9, showing the roller and clamp arm as seen from the line 10—10 of FIG. 9.

DETAILED DESCRIPTION OF THE PREFERRED EMBODIMENT

Figure 1:
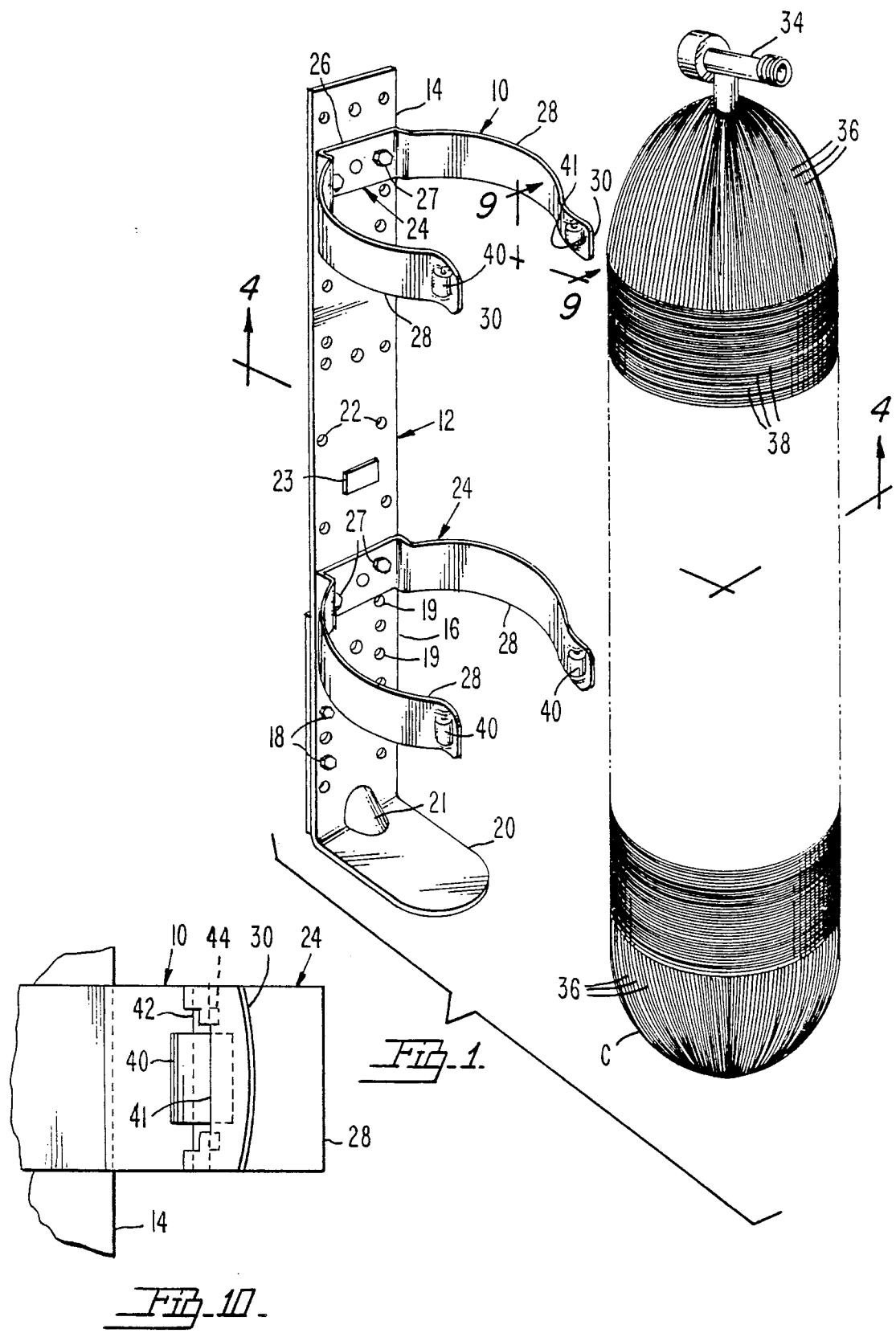
FIG. 1 is an exploded perspective view illustrating a mounting bracket formed according to the present invention, in association with a composite, wound air cylinder.

The cylinder support bracket or mounting plate comprising the present invention has been generally designated 10, and includes a vertically elongated, rigid backplate generally designated 12. In the preferred embodiment illustrated in the drawings, the backplate comprises upper and lower backplate elements 14, 16 respectively. Both, in the illustrated example, are formed of flat, sheet steel or other suitably strong, durable, rigid material. The upper backplate element 14 is in the form of an elongated, one-piece, rectangular, flat member. The lower backplate element 16 is secured to the front surface of the lower end portion of the upper element by means of bolts 18 passing through selected adjustment openings 19 formed in vertical rows in the respective elements. The openings of the rows are transversely aligned. Accordingly, the backplate element 16 can be adjusted upwardly or downwardly in respect to the upper element 14, and in each position of adjustment the bolts 18 are extendable therethrough to rigidly connect the elements in the selected position of adjustment. This permits the overall length of the device to be adjusted, according to the length of the particular cylinder C that is to be supported thereon.

The lower backplate element 16 is provided with a forwardly projecting, horizontal ledge 20 at its lower end, on which the bottom end of the cylinder C is adapted to rest, and a gusset or suitable strengthening means 21 is utilized for the purpose of strengthening the construction of the lower backplate element in its desired L-shape.

Figure 2:
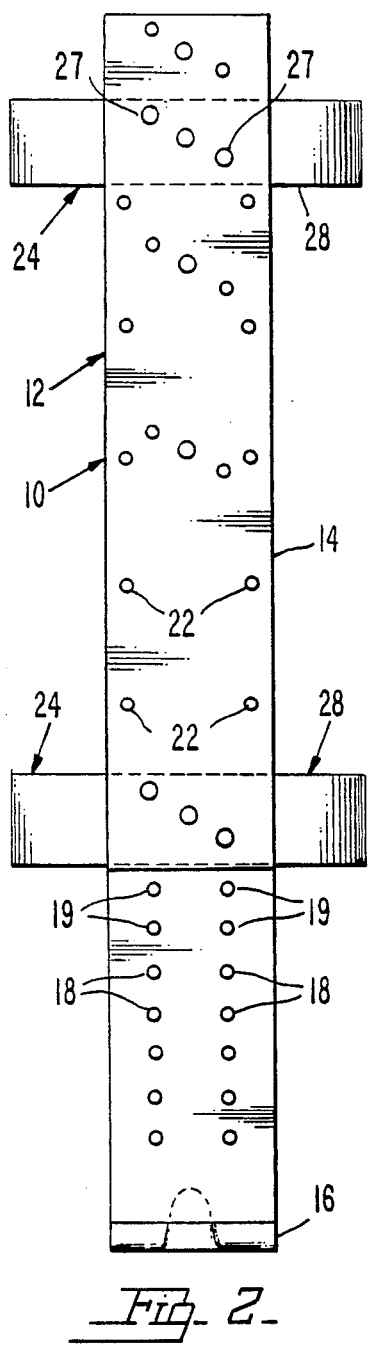
FIG. 2 is a rear elevational view of the bracket.

Above the lower element, the upper element 14 is formed (see FIGS. 1 and 2) with vertically spaced pairs of openings 22, which are adapted to receive bolts, not shown, or other fastening elements for the purpose of securing the bracket to an appropriate vertical mounting surface, also not shown. The mounting surface could comprise the wall of an equipment room of a fire house or rescue squad location. Or, the mounting surface could be the back wall of a jump seat of a fire truck or rescue squad vehicle, or other wall of said vehicle.

Secured fixedly to and projecting forwardly from the bracket 10, are horizontally disposed, C-shaped clamp members 24. The clamp members are identical, each including a base or bight portion 26, having openings adapted to receive connecting bolts 27, whereby the clamp members are secured to the bracket 10 at selected locations along the length of the bracket. As will be noted from FIG. 2, the bracket is provided with vertically spaced series of openings, any of which are adapted to receive the connecting bolts, thereby permitting the mounting of the clamp members in selected positions relative to each other, for the purpose of accommodating cylinders C of varying lengths.

Figure 4:
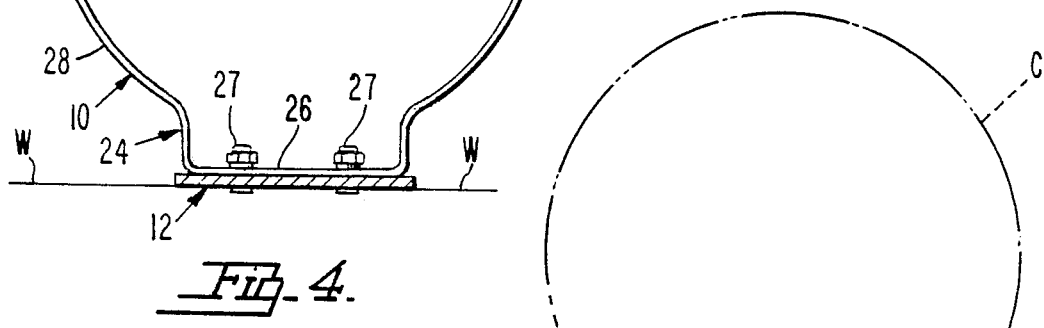
FIG. 4 is a transverse sectional view substantially on line 4—4 of FIG. 1, on an enlarged scale, illustrating the bracket and cylinder with the cylinder approaching contact with the bracket.

Each of the clamp members 24 is formed with a pair of outwardly curved spring clamp arms 28, integral with and projecting forwardly from the base portion 26. Arms 28, when in their untensioned rest conditions shown in FIG. 4, are curved for almost their full lengths about a common center, on a radius substantially duplicating that of the cylinder C intended to be clamped and supported upon the bracket.

The intermediate portions of the clamp arms, curved about a common center as described above, respectively merge near their distal extremities into outwardly directed, relatively straight guide lips 30, 30 (see FIG. 3) diverging outwardly from the backplate 14 from reentrant angular portions 32, 32.

Referring now to the composite cylinder C, as previously noted herein a cylinder of this type comprises a relatively thin-walled aluminum shell having a nozzle 34 at one end, said shell being completely covered with glass fiber wrappings. The wrappings, typically, are in the form of glass fiber filaments 36, which are wound in a direction extending longitudinally of the cylinder. The filaments are impregnated with epoxy resin.

Inwardly from the respective ends of the cylinder, glass fiber filaments 38 are wound helically. These also are impregnated with epoxy resin, and may be wound in as many layers as found desirable to assure that the cylinder will be of suitable strength when in use.

A construction as described produces a composite cylinder which though only half as heavy as a steel cylinder, will be just as strong as a steel cylinder and will not explode when subjected to extreme pressure.

A cylinder of this type, however, has the above-mentioned desirable characteristics only if the integrity of the windings 36, 38 is fully preserved. Should the filaments be cut, the complete integrity of the windings is lost, and the cylinder must be taken out of service and rewrapped at high cost.

Accordingly, the invention embodies the use of idler rollers 40, rotating about axes parallel to the length of the backplate. The rollers 40 are positioned in rectangular roller-receiving openings 41 of the clamp arms, located in the reentrant portions 32, so that the roller-receiving openings extend partially within the curved intermediate portions 43 of the clamp arms (FIGS. 3 and 9) and within the outwardly bent guide lips 30.

To mount the rollers, there are provided pins 42. These extend through axial openings of the rollers, and are engaged (FIGS. 3 and 9) between the reentrant angular portions 32, and outwardly struck pin retainer strips 44. Strips 44 are struck outwardly from the material of the clamp arms, at locations above and below the respective openings 41 (see FIG. 9), and subtend the angles defined by the reentrant portions 32.

Figure 3:
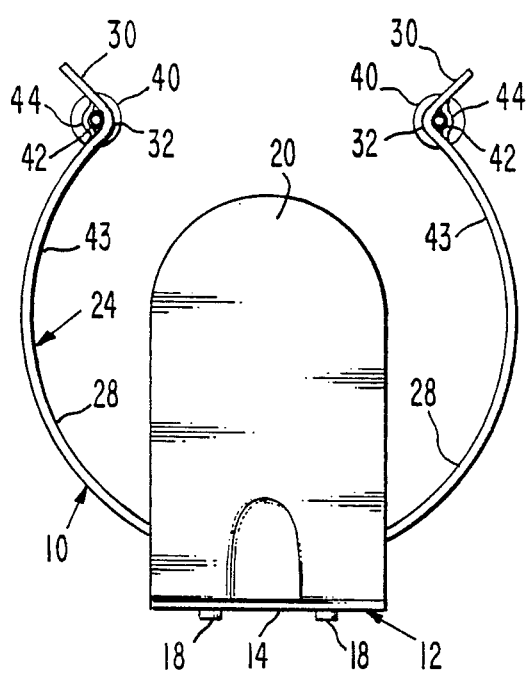
FIG. 3 is a bottom plan view thereof.
Figure 9:
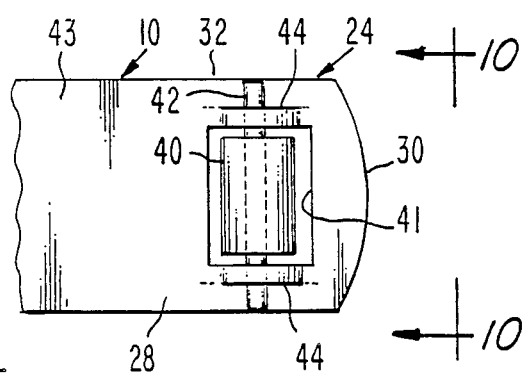
FIG. 9 is a greatly enlarged, fragmentary, detail elevational view of one of the rollers, as seen from the line 9—9 of FIG. 1.

The rollers 40, by reason of the particular arrangement illustrated in FIGS. 3, 9 and 10, project inwardly toward each other, adjacent the distal extremities of the clamp arms.

It is important, in this regard, that the geometry of the rollers and clamp arms be considered, since this has an important bearing on the proper functioning of the device.

Figure 8:
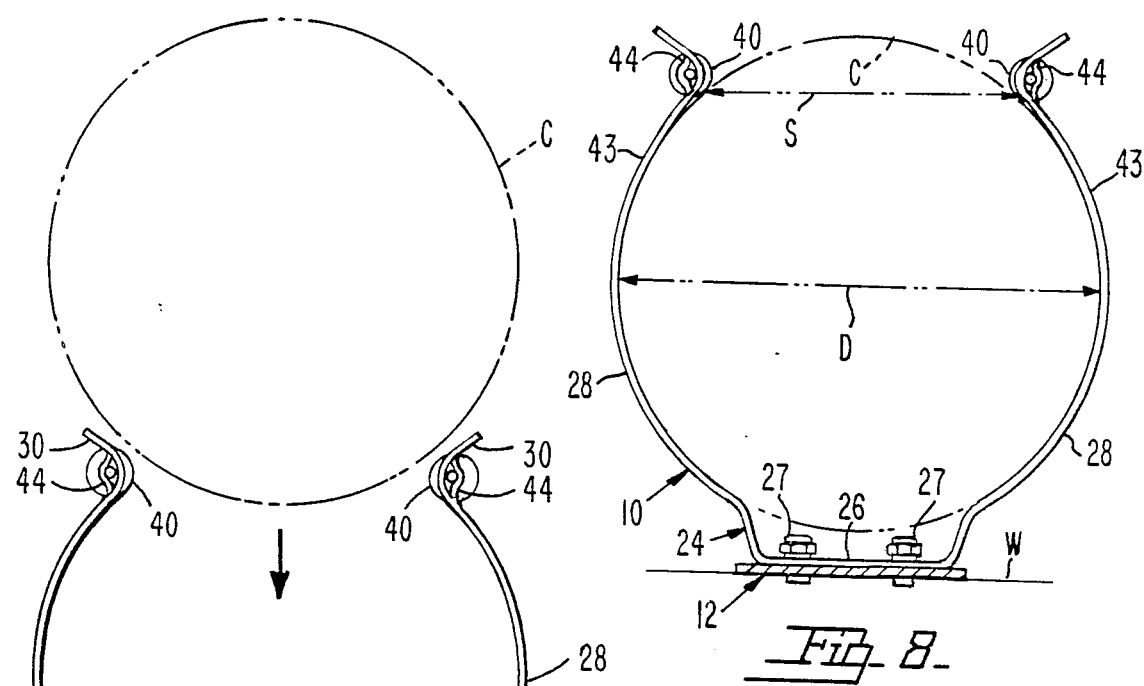
FIG. 8 is a view like FIG. 4 with the cylinder fully inserted.

In this connection, referring to FIG. 8 it will be noted that a distance S is measured parallel to the surface of the wall W on which the device is mounted, or stated otherwise, parallel to the plane of the flat backplate 12. It may also be seen from FIG. 8 that when the cylinder C has been fully inserted and has its outer diameter in contact with the inner surfaces of the curved intermediate portions 43 of the clamp arms, the outer diameter of the cylinder will be tangent to the respective rollers 40. The clamp arms, functionally, comprise cantilevers, and each clamp arm with its associated roller may be regarded as a cantilever unit. It is thus seen from FIG. 8 that S spans from that point of each cantilever unit that is furthest away from base 26 while still remaining tangent to the cylinder C.

In accordance with the invention, there is an optimal length of distance S, in relation to the diameter D of cylinder C. As S becomes smaller than the specified optimal value, it has a tendency to buckle as a column. When S becomes greater than said value, the force created by the cantilevers perpendicular to the mounting plane reduces to values too small to securely hold the cylinder in place.

To assure that an optimal value of S is established for a particular cylinder diameter, the following equation will govern, for values of diameter D falling within the range of 5-6.75 inches:

$$S = 12.92 - [91.628 - (D - 0.325)]^{178}$$

Where the value of diameter D is in the range of 6.75-8 inches, the equation for determining the distance S is as follows:

$$S = 0.866D$$

The roller diameter, as indicated above, should be such as to permit the roller to project inwardly within the area spanned by the distance S and in a preferred embodiment the roller diameter D is calculated according to the following equation:

$$d/D = 0.08''$$

When a mounting bracket is constructed according to the above, it functions in the manner shown to particular advantage in FIGS. 4-8. In FIG. 4, the cylinder C is approaching the mounting bracket, as shown by the direction arrow in that figure of the drawing. As it approaches the cantilever units, it initially may contact one or the other, or both of the outwardly bent guide lips 30. This, however, does not harm the glass fiber windings, because they contact the flat faces of the guide lips, and slide along them as they are guided between the cantilever units.

Figure 5:
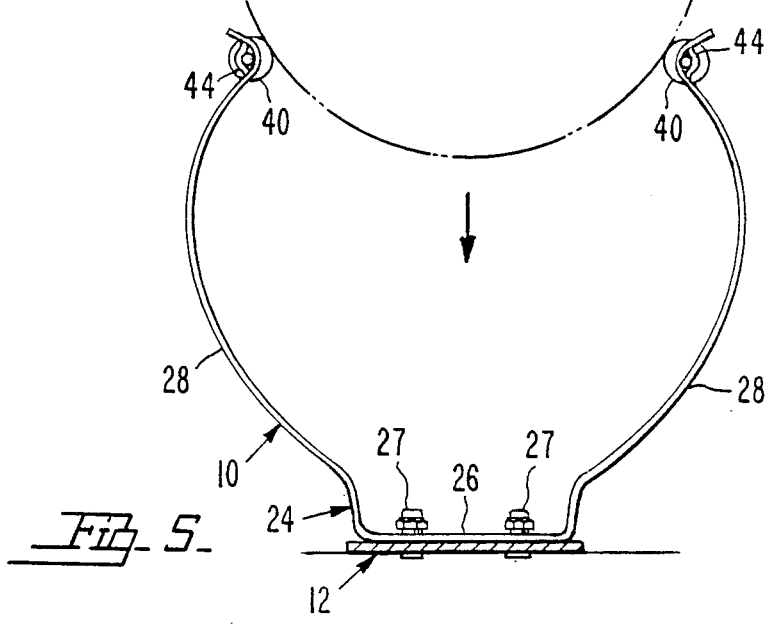
FIG. 5 is a view like FIG. 4 in which the cylinder has made contact with the bracket and has partially spread the clamp arms.

Further inward movement of the cylinder causes the cylinder to engage the rollers, as shown in FIG. 5, as a result of which pressure is exerted by the cylinder diameter tending to spread the spring clamp arms 28.

Further inward movement is shown in FIG. 6, wherein it is seen that the cylinder is at all times in contact with the rollers and with no other portions of the clamp arms, during the actual inward movement of the cylinder. In FIG. 6, the point of greatest diameter of the cylinder has not yet passed the rollers, as a result of which continued spreading of the clamp arms is occurring. In FIG. 7, however, the point of greatest diameter of the cylinder has now passed the rollers, which remain in contact with the cylinder. The clamp arms are beginning to return to their original, FIG. 4 positions. In FIG. 8, the cylinder has been fully inserted, and now the curved intermediate portions 43 of the clamp arms are in full contact with the surface of the cylinder, while the rollers 40 remain tangent to the cylinder surface.

It is important to note that the act of insertion of the cylinder results in the cylinder being contacted only by the rollers, and the smooth, unbroken faces of the guide lips, until the cylinder has been fully inserted, at which time the inner faces of the clamp arms now also contact and grip the cylinder securely. At no time, however, does the cylinder wrap make any contact with edges or other surfaces that may tend to damage the wrap.

When the user dons a harness, and walks away from the mounted bracket, this pulls the cylinder out of the bracket. Immediately, the outward movement of the cylinder causes the cylinder to engage only the rollers, as it is pulled completely free of the clamp arms, with the clamp arms spreading as necessary, and returning to their rest positions only when the cylinder has been fully removed. Again, damage to the wrap is minimized.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

We claim:

1. A mounting bracket especially for supporting an SCBA composite air cylinder of the type in which glass fiber filaments are wrapped about a metal shell, comprising:
   (a) a backplate adapted for wall mounting; and
   (b) a plurality of clamp members projecting forwardly from the backplate in spaced relation, each of said clamp members being approximately C-shaped and including
      (1) a generally flat base affixed to the backplate;
      (2) a pair of resiliently, yieldably spreadable clamp arms projecting forwardly from the base and adapted to clampably engage a cylinder inserted therebetween, and
      (3) rollers on the respective arms projecting into the space therebetween in position to rollably engage the cylinder during its passage through said space, said clamp arms further including guide lips disposed adjacent the rollers, said guide lips diverging forwardly from the backplate in position to guide a cylinder into the space between the clamp arms for engagement by the respective rollers, the clamp arms of each clamp member including intermediate portions curved about a common center on a radius substantially duplicating that of the cylinder supported by the bracket, the intermediate portions and the guide lips defining reentrant angular portions projecting inwardly toward each other at opposite sides of said space, said rollers of the respective clamp members being mounted in the reentrant angular portions, said rollers being tangent to a circle described about the common center of the clamp arms on said radius.

2. A mounting bracket for air cylinders as in claim 1, wherein the distance between the points at which the rollers are tangent to said circle when measured along a line parallel to the plane of the back plate is substantially less than the diameter of the circle, whereby to spread the arms in response to insertion of the cylinder sufficiently to maintain the rollers in engagement with the air cylinder substantially over the full extent of the movement of the air cylinder during its passage between a first position in which it is disposed fully out of contact with the mounting bracket, and a second position in which it is clampably engaged by the arms of the respective clamp members.

* * * * *